United States Patent
Shannon et al.

(10) Patent No.: US 9,037,630 B2
(45) Date of Patent: May 19, 2015

(54) SYSTEMS AND METHODS FOR PROVISIONING DIGITAL FORENSICS SERVICES REMOTELY OVER PUBLIC AND PRIVATE NETWORKS

(71) Applicants: Matthew Martin Shannon, Tampa, FL (US); Matthew James Decker, Valrico, FL (US)

(72) Inventors: Matthew Martin Shannon, Tampa, FL (US); Matthew James Decker, Valrico, FL (US)

(*) Notice: Subject to any disclaimer, the term of this patent is extended or adjusted under 35 U.S.C. 154(b) by 288 days.

(21) Appl. No.: 13/706,695

(22) Filed: Dec. 6, 2012

(65) Prior Publication Data

US 2013/0218940 A1    Aug. 22, 2013

Related U.S. Application Data

(60) Provisional application No. 61/601,049, filed on Feb. 21, 2012, provisional application No. 61/647,069, filed on May 15, 2012.

(51) Int. Cl.
| | |
|---|---|
| *G06F 15/16* | (2006.01) |
| *H04L 29/06* | (2006.01) |
| *H04L 29/08* | (2006.01) |
| *G06F 21/55* | (2013.01) |
| *G06F 21/57* | (2013.01) |

(52) U.S. Cl.
CPC ............... *H04L 65/40* (2013.01); *H04L 67/34* (2013.01); *H04L 63/30* (2013.01); *G06F 21/552* (2013.01); *G06F 21/577* (2013.01); *G06F 2221/2115* (2013.01)

(58) Field of Classification Search
CPC ......... H04L 65/40; H04L 63/30; H04L 67/34; G06F 2221/2115; G06F 21/552; G06F 21/577

USPC .......................................... 709/201, 230, 246
See application file for complete search history.

(56) References Cited

U.S. PATENT DOCUMENTS

| | | | |
|---|---|---|---|
| 6,345,283 | B1 | 2/2002 | Anderson |
| 6,701,456 | B1 | 3/2004 | Biessener |
| 6,792,545 | B2 | 9/2004 | McCreight |
| 7,016,951 | B1 | 3/2006 | Longworth |
| 7,194,619 | B2 | 3/2007 | Abbondanzio |
| 7,640,323 | B2 | 12/2009 | Sun |
| 7,899,882 | B2 | 3/2011 | Shannon |
| 8,171,108 | B2 | 5/2012 | Shannon |
| 2002/0129264 | A1 | 9/2002 | Rowland |
| 2002/0162017 | A1 | 10/2002 | Sorkin |
| 2003/0208689 | A1 | 11/2003 | Garza |
| 2003/0236993 | A1 | 12/2003 | McCreight |
| 2004/0177032 | A1 | 9/2004 | Bradley |
| 2004/0260733 | A1 | 12/2004 | Adelstein |

(Continued)

*Primary Examiner* — Hee Soo Kim
(74) *Attorney, Agent, or Firm* — Jeffrey S. Melcher; Manelli Selter PLLC

(57) ABSTRACT

Provided are systems and methods for remote collection, preservation, and analysis of computer-based evidence in the course of conducting a network-based forensics or electronic discovery service. The challenge is to collect and analyze Electronically Stored Information (ESI) in a forensically sound manner over public and private networks. This is achieved via network-based forensics that may be conducted via an end user computer communicating directly with one or more subject computers across public or private networks, or it may be achieved via a "cloud computing" model whereupon the end user obtains, from the Internet, temporary use of shared resources, software, and information for the purpose of conducting digital forensics and eDiscovery upon subject computers.

39 Claims, 10 Drawing Sheets

(56) References Cited

U.S. PATENT DOCUMENTS

| | | |
|---|---|---|
| 2005/0044244 A1 | 2/2005 | Warwick |
| 2005/0166082 A1 | 7/2005 | Williams |
| 2005/0216668 A1 | 9/2005 | Kobayashi |
| 2007/0168455 A1 | 7/2007 | Sun |
| 2007/0299996 A1* | 12/2007 | Guy et al. .............. 710/63 |
| 2010/0299740 A1 | 11/2010 | Sheldon |
| 2011/0153748 A1 | 6/2011 | Lee |

* cited by examiner

Fig. 7

SYSTEMS AND METHODS FOR PROVISIONING DIGITAL FORENSICS SERVICES REMOTELY OVER PUBLIC AND PRIVATE NETWORKS

This application claims priority to U.S. provisional patent application Ser. Nos. 61/601,049, filed 21 Feb. 2012, and 61/647,069, filed 15 May 2012, the complete disclosures of which are incorporated herein by reference.

FIELD OF THE INVENTION

The present invention generally relates to systems and methods for conducting forensics services on a computing device, and more particularly to the remote collection, preservation, and analysis of computer-based evidence in the course of conducting a forensics or electronic discovery service over public and private TCP/IP (Transmission Control Protocol/Internet Protocol) networks. The invention allows individuals, whom may not otherwise be qualified in digital forensic techniques, to identify, preserve, collect and analyze Electronically Stored Information (ESI) in a forensically sound manner over public and private networks. This can be achieved via network-based forensics that may be conducted in a number of ways. As one example, this can be achieved via a "cloud computing" model whereupon the end user obtains, from the Internet, temporary use of shared resources, software, and information for the purpose of conducting digital forensics and eDiscovery upon subject computers. As another example, this can be achieved over public or private networks, such as a company network or the Internet, via two computers that are directly connected (peer to peer aka P2P) across the network via standard and widely used TCP/IP protocols, such as HTTP, HTTPS, iSCSI or NBD (Network Block Device) protocols. In either case, the end user must obtain read-only access to the raw (physical) non-transitory computer-readable media devices of the subject computers in order to perform forensically sound digital forensics services.

BACKGROUND OF THE INVENTION

Computer examination services include, but are not limited to, electronic discovery (eDiscovery), digital forensics, incident response, digital investigations, file recovery, system identification, data preservation, data collection and data analysis. In order that computer examination services produce information that is suitable for use in a court of law, these services should be provided in a manner consistent with accepted practices from the fields of Computer forensics and eDiscovery. Computer forensics and eDiscovery are scientific fields that address the identification, preservation, collection and analysis of data stored on computer systems such that the data is suitable for use in a court of law. Electronic discovery (eDiscovery) refers to the discovery of Electronically Stored Information (ESI) in civil litigation proceedings. Those involved in eDiscovery may include computer forensic practitioners, lawyers, IT personnel, and others, yet sound computer forensics practices are employed to the extent that they are reasonable and practical because the data is subject to being used in a court of law.

Computers, in a myriad form of computing devices (e.g. desktops, laptops, tablets, gaming devices, phones, mobile devices, etc) are increasingly relied upon for personal and business communications, data creation, data management, and in general, as short and long term data repositories. The information that can be found in these data repositories are often sought after to establish innocence or guilt in a court of law, thus the process of identification, preservation, collection and analysis of data stored on subject computer systems must often be accomplished in accordance with procedures that do not preclude the use of the data as evidence in a court of law. The computer forensics and eDiscovery fields offer acceptable processes and procedures for the identification, preservation, collection and analysis of computer data, but historical application of these processes and procedures have required the dedication of considerable amounts of time from experienced forensics and eDiscovery practitioners. Thorough analysis of computer media, such as a hard drive, is a time consuming endeavor, and traditionally required physical access to the subject computer during some phase of the identification, preservation, collection and analysis process.

Accordingly, there is a need for faster, more cost effective methods of performing a forensics investigation.

Another challenge to providing forensic services is gaining access to the computing device. The computing device may be used in an ongoing business enterprise and include sensitive data, which if made public could compromise legitimate business or personal interests. Another challenge is that of identifying computing devices which may have desired evidence. A large corporation may have hundreds, perhaps thousands of computers connected by various networks. Culpable data might be present only on relatively few computers, if any. Obtaining physical custody of all these computers could shut down a large enterprise, or otherwise damage legitimate ongoing business operations. Consequently, it is desirable to gain access to computing devices remotely.

Further, a computer forensic analysis may be a very time consuming and expensive process. Typically, the forensic practitioner takes custody of the subject computer, documents it, images it, analyzes it, issues a report, and returns the computer to the customer. In many instances, this substantial effort may reveal that the computer has no desired evidence stored on it. Consequently, spending such a large effort (time and money) to determine whether or not evidentiary data is present (and is in need of preservation) on one computer often is not practical or economically feasible. Accordingly, there is a need for more cost effective forensic analyses.

Embodiments of the present invention address these and other challenges to provide an effective forensics service allowing secure, remote access to a subject computer, which may remain situated in its working environment.

A prior method of remotely conducting an examination is disclosed in my published U.S. Patent application serial No. 2011/0113139, filed 17 Jan. 2011 as U.S. patent application Ser. No. 13/007,874, the complete disclosure of which is incorporated herein by reference.

SUMMARY OF THE INVENTION

The invention permits forensically sound examinations to be conducted remotely upon geographically dispersed subject computers, and eliminates the need for the examiner to have physical access to the subject computer to perform the services.

Provided is a method and system for performing forensically sound computer examination services over public and private networks, including the Internet. Examination (aka "inspection") services are generally performed upon data stored on subject computers in order to obtain ESI in such a manner that the information is suitable for use in a court of law.

The invention emulates all non-transitory computer-readable media devices on a machine as raw (physical), read-only SCSI devices, whether the devices are inherently SCSI devices or not. The invention translates SCSI and non-SCSI devices such that the SCSI command set is used to establish raw, read-only connectivity to subject computer devices from a second computer, over a network. As a result, every non-transitory computer-readable media device on a subject computer becomes a SCSI disk rendered on the second computer, and that SCSI disk is rendered to the second computer as a raw (physical) non-volatile, read-only device.

Consider as an example, the use of NBD (Network Block Device) to connect to a remote computing device to facilitate the remote collection, preservation, and analysis of computer-based evidence. A Network Block Device (NBD) is a standard remote data storage access protocol, introduced in 1998, that allows a client computer to access a data store on a remote system over a TCP/IP communications network. Once the client computer has established an NBD connection, it is used as though it were a disk drive actually on the client as opposed to somewhere else on the network. The network block device on the server can be an actual hard disk or even a special type of file that can be accessed as though it were a disk; however, using the standard NBD protocol to establish an NBD connection does not render the NBD as a raw, physical disk on the client computer. An NBD connected device does not act like raw (physical) disk on the client computer. If an NBD connected non-transitory media is to be identified by the client computer operating system as a full physical disk, then it must be "translated" to the client computer to be rendered as a raw (physical) disk. The invention facilitates this translation. The invention emulates all non-transitory computer-readable media devices on the subject computer allowing them to be rendered as raw (physical), read-only SCSI devices to the client computer. As such, the end user obtains read-only access to the raw (physical) non-transitory computer-readable media devices of the subject computers in order that forensically sound digital forensics services may be performed.

The invention reduces delivery times and costs for identification, preservation, collection and analysis of ESI by enabling the process to be conducted upon geographically dispersed subject computers from a central location and by individuals whom may not otherwise be qualified in digital forensic techniques, thus significantly reducing or eliminating the time required of a qualified forensics practitioner in conducting digital forensics or eDiscovery operations. This improvement significantly increases the efficiency and affordability of digital forensics and eDiscovery data identification, preservation, collection and analysis services. The invention achieves these objectives via a cloud computing system and method, using shared resources, software, and information to provide computer forensics and eDiscovery services on demand.

The Cloud-based architecture rendition of the invention comprises the following:

1) A customer has one or more subject computers on which they would like to conduct the forensic or eDiscovery process in order to identify, preserve, collect and analyze data, including but not limited to deleted items, Internet history, communications history, file use history, email stores, registry data, journal data, and recent mount points, as just a few examples.
2) The customer boots the subject computer, optionally from external media (e.g. CD or thumb drive), and executes a subject program code on the subject computer. The subject program code can be downloaded over the Internet from a website or installed from external media.
3) The subject program code is configured to provide communications via a standard TCP/IP communication protocol. The subject program code maintains read-only access to the subject computer "non-transitory" computer-readable media and, thus does not permit the examiner to alter the files or Metadata on the subject computer. The subject program code is constructed to translate commands from a non-transitory computer-readable media device of any type to a read-only SCSI non-volatile media device, and thus cannot write to the read-only non-transitory computer-readable media in response to receiving any command including a write command. This establishes both the read-only capability of the invention, and the capability to present the non-transitory computer-readable media devices on the subject computer as raw (physical) non-volatile computer-readable media devices on the examiner computer.
4) A control program code is executed on a cloud-based computer, such as a command and control computer. The control program code is configured to provide communications via a communication protocol.
5) A secure, authenticated Message-Oriented Middleware (MOM) connection, such as an Advanced Message Queuing Protocol (AMQP) or Extensible Messaging and Presence Protocol (XMPP) connection, is established between the command and control computer (also referred to as a "control computer") and the subject computer using the subject program code and control program code. The MOM connection is preferably tunnelled over SSL/TLS for increased security.
6) A secure, authenticated HTTPS connection is also established between a cloud-based computer, such as a data-repository computer, and the subject computer using the subject program code. Preferably, the data-repository computer and control computer are not directly connected to one another.
7) An examiner program code is executed on an examiner computer. The examiner program code is configured to provide communications via a communication protocol. The examiner computer establishes a connection to the control computer and a separate connection to the data-depository computer.
8) An examiner conducts live analysis over the Internet via the cloud-based control computer, which proxies all communications between the examiner computer and the one or more subject computers being examined.
9) The MOM connection permits the examiner to identify, preserve, collect and/or analyze the data on one or more subject computers in a forensically sound manner. The examiner cannot alter the probative data on the subject computer.
10) The examiner can select data on the subject computer to be uploaded to the cloud-based data-repository computer, for preservation, collection, and further analysis. Data is uploaded in a manner that catalogues and preserves the integrity of each file, and file system Metadata, thus permitting the examiner to identify, preserve, collect and/or analyze the data on one or more subject computers in a forensically sound manner.
11) Upon terminating the control computer connection to any subject computer, the examiner maintains access to any preserved and collected data that has been uploaded to the data-repository computer, thus providing the examiner with exclusive and perpetual access to that data for further analysis.
12) The examiner can output a report from the forensic data or eDiscovery process. A typical report could include, as examples, subject computer identifying characteristics such as serial numbers and asset tags, subject computer BIOS and system parameters, a listing of installed programs, a listing of mapped network drives, passwords or keys stored in active memory (RAM), and log files documenting examiner actions taken during the subject computer inspection.

The Peer-to-peer network-based architecture rendition of the invention comprises the following:

1) A customer has one or more subject computers on which they would like to conduct the forensic or eDiscovery process in order to identify, preserve, collect and analyze data, including but not limited to deleted items, Internet history, communications history, file use history, email stores, registry data, journal data, and recent mount points, as just a few examples.
2) The customer boots the subject computer, optionally from external media (e.g. CD or thumb drive), and executes a subject program code on the subject computer. The subject program code can be downloaded over the Internet from a website or installed from external media.
3) The subject program code is configured to provide communications via a standard TCP/IP communication protocol. The subject program code maintains read-only access to the subject computer "non-transitory" computer-readable media and, thus does not permit the examiner to alter the files or Metadata on the subject computer. The subject program code is constructed to translate commands from a non-transitory computer-readable media device of any type to a read-only SCSI non-volatile computer-readable media device, and thus cannot write to non-transitory computer-readable media in response to receiving any command including a write command. This establishes both the read-only capability of the invention, and the capability to present the non-transitory computer-readable media devices on the subject computer as raw (physical) non-volatile computer-readable media devices on the examiner computer.
4) An examiner program code is executed on an examiner computer. The examiner program code is configured to provide communications with the subject computer via a standard TCP/IP communication protocol. The examiner computer establishes a direct peer-to-peer connection to the subject computer.
5) An examiner conducts live collection or analysis over the Internet upon the one or more subject computers being collected or examined.
6) The examiner can select data on the subject computer to be uploaded to the examiner computer, for preservation, collection, and further analysis. Data is uploaded in a manner that catalogues and preserves the integrity of each file, and file system Metadata, thus permitting the examiner to identify, preserve, collect and/or analyze the data on one or more subject computers in a forensically sound manner.
7) Upon terminating the connection to any subject computer, the examiner maintains access to any preserved and collected data that has been uploaded to the examiner computer, thus providing the examiner with exclusive and perpetual access to that data for further analysis.
8) The examiner can output a report from the forensic data or eDiscovery process. A typical report could include, as examples, subject computer identifying characteristics such as serial numbers and asset tags, subject computer BIOS and system parameters, a listing of installed programs, a listing of mapped network drives, passwords or keys stored in active memory (RAM), and log files documenting examiner actions taken during the subject computer inspection.

The present invention provides the following advantages:

1) The examiner need not travel to the site of one or more subject computers in order to identify, preserve, collect and/or analyze the data on those subject computers in a forensically sound manner.
2) The data that the examiner has uploaded, whether directly to the examiner computer or a cloud-based computer such as a data-repository computer, is available for exclusive and perpetual access to the examiner, or to whomever the examiner chooses to allow access. The examiner maintains the ability to authenticate and identify the source of the uploaded data, and thus can handle it in accordance with the Federal Rules of Evidence. As such, the examiner can maintain a chain of custody over the data.
3) Forensic imaging of hard drives, flash drives, register memory, processor cache, RAM or other "non-transitory" computer-readable media can be accomplished over the Internet using this invention.
4) The "non-transitory" computer-readable media is available to be preserved in part or in entirety because the invention renders the media devices as raw (physical) non-transitory computer-readable media devices on the examiner computer.
5) The "non-transitory" computer-readable media cannot be altered in any way by the examiner because the invention renders the devices as read-only non-transitory computer-readable media devices on the examiner computer.
6) Turn-around time to complete an inspection upon a subject computer is greatly reduced since the inspection can be conducted from anywhere on the Internet, and upon a subject computer that is accessible anywhere via the Internet.
7) The customer need not forfeit physical control of the subject computer in order for an inspection to be conducted.
8) Using this invention, the time required of an expensive expert resource is minimized for conducting an inspection.
9) Using this invention, the process of identifying, preserving, and collecting the data on one or more subject computers can be accomplished in a forensically sound manner by trusted resources with much more limited skill sets than those of an expert in digital forensics or eDiscovery.

BRIEF DESCRIPTION OF THE DRAWINGS

FIG. 7 illustrates a screen capture showing review of the data uploaded to the cloud based computer, such as a data-repository computer, using the Data Store Explorer capability of the invention.

DETAILED DESCRIPTION OF THE INVENTION

In the following description, for purposes of explanation and not limitation, specific details are set forth, such as particular networks, communication systems, computers, terminals, devices, components, techniques, storage devices, data and network protocols, software products and systems, operating systems, development interfaces, hardware, etc. in order to provide a thorough understanding of the present invention.

However, it will be apparent to one skilled in the art that the present invention may be practiced in other embodiments that depart from these specific details. Detailed descriptions of well-known networks, computers, digital devices, storage devices, components, techniques, data and network protocols, software products and systems, development interfaces, operating systems, and hardware are omitted so as not to obscure the description of the present invention.

The field of computer forensics addresses acceptable processes and procedures for the collection, preservation, and analysis of computer-related evidence in the course of conducting a forensic analysis. The present invention significantly reduces the time required to perform forensics analyses by presenting a means to remotely manage and enable the collection, preservation, and analysis process, thus removing the direct, on-site involvement of a forensics practitioner. Thus, the present invention significantly increases the efficiency and affordability of digital forensics investigations.

The invention will now be explained with reference to the attached non-limiting Figures.

Figure 1:
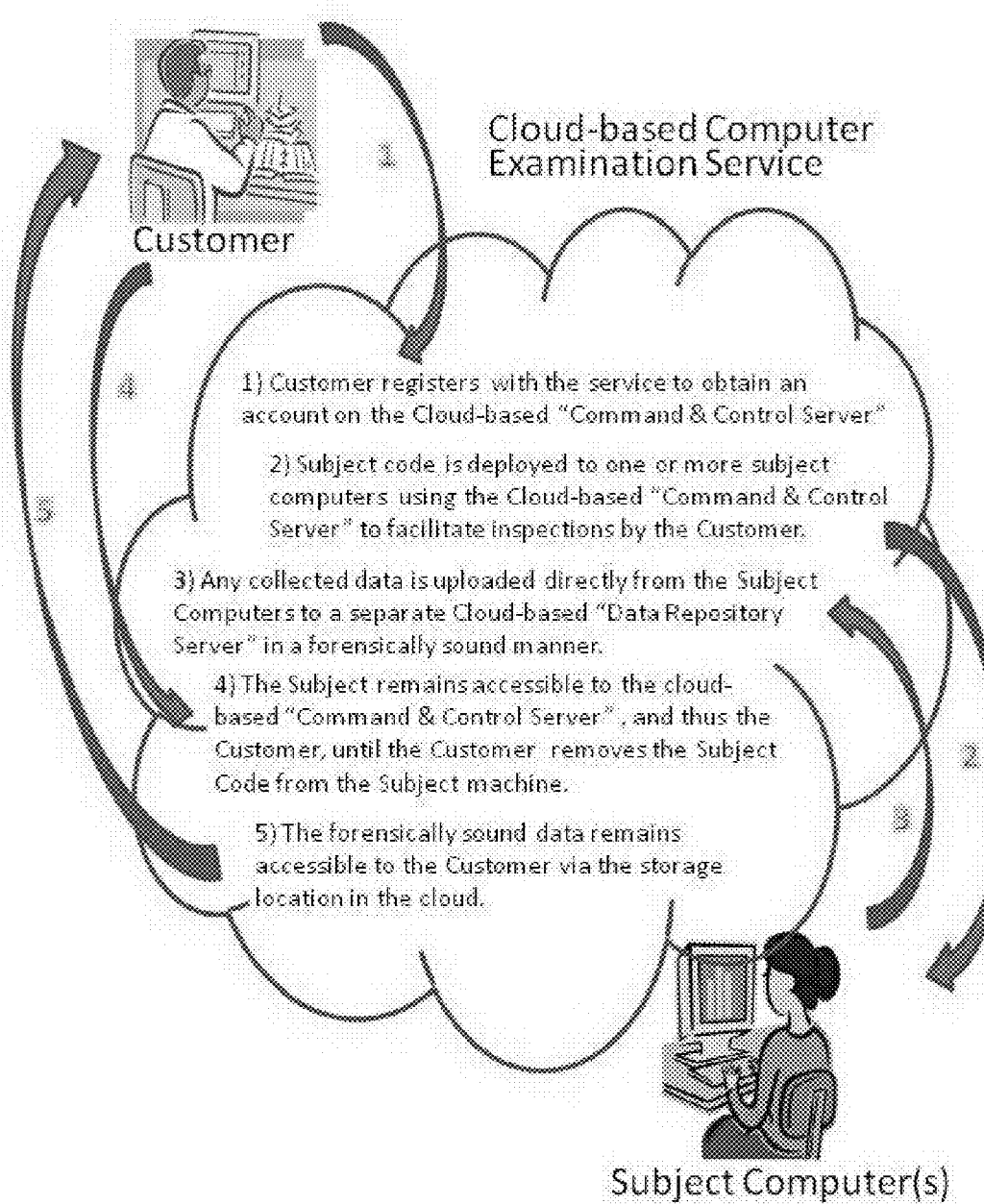
FIG. 1 illustrates an example of the cloud computing digital forensics and eDiscovery system according to the invention.
Figure 2:
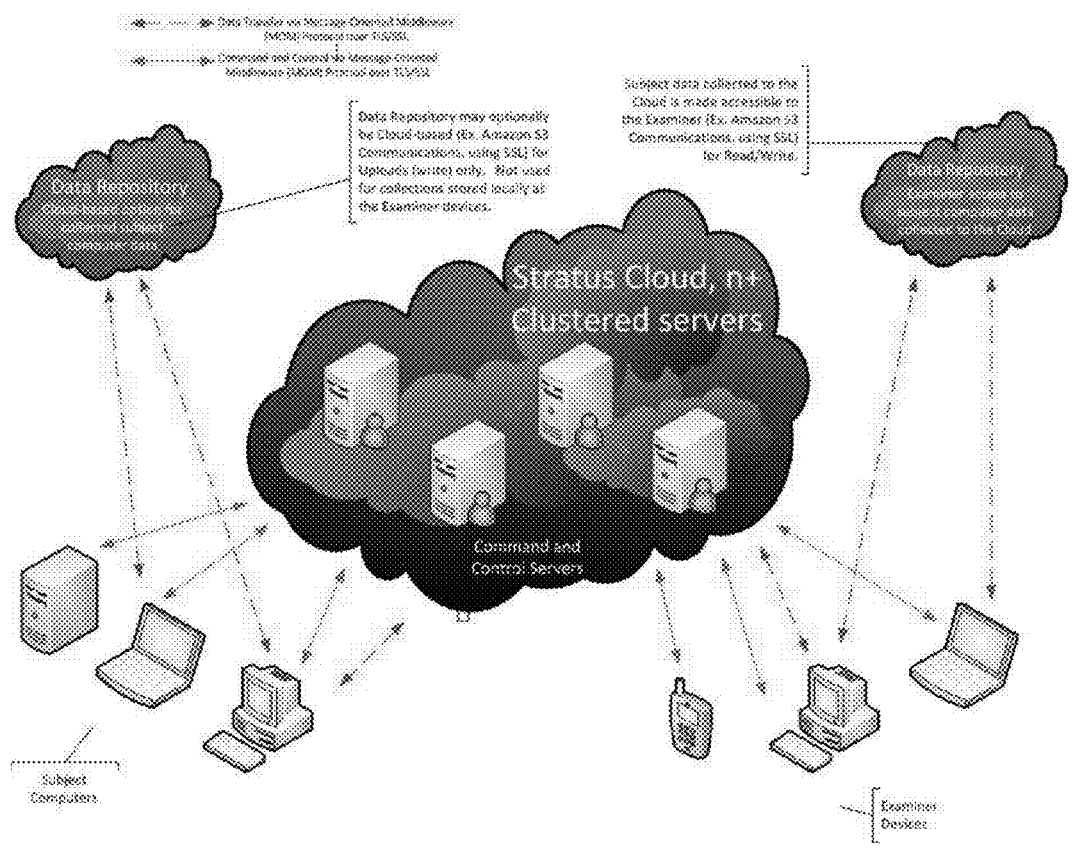
FIG. 2 illustrates an exemplary computer system according to the present invention.

As shown in FIGS. 1-2, preferably, the cloud-based computer system comprises at least two separate computer systems, a "command and control computer 2" (also referred to as a "control computer") and a "data-repository computer 4." The term "cloud-based" is used in the broadest sense to mean any computer connected to the Internet. Most preferably, the control computer 2 and the data-repository computer 4 have no direct connection, as shown in FIG. 2. While the invention is explained with reference to a separate control computer 2 and data-repository computer 4, a single cloud-based computer can be used for both.

A customer can connect to the control computer 2 over the Internet using an examiner computer 6. An Internet connection is then established between the control computer 2 and the subject computer(s) 8. A separate Internet connection is established between the subject computer 8 and the data-repository computer 4. Another Internet connection is established between the examiner computer 6 and the data-repository computer 4. Preferably, no direct connection is established between the examiner computer 6 and the subject computer 8.

In a preferred system, the customer first registers by connecting the examiner computer 6 to a web page over the Internet that signs the customer in and delivers examiner program code to the examiner computer 6. When executed, the examiner program code provides communications via a communication code. A control program code is executed on the control computer 2, which provides communications via a communication code. The examiner computer 6 is then connected to the control computer 2. This step obtains Customer information, such as billing information, establishes usage agreements, communicates instructions for use of the system, and obtains other relevant information as needed.

The registered customer can purchase temporary rights to use the system, which is typically delivered as a service via a cloud computing model, but can be deployed for exclusive use on a private network if cloud-based systems are not desired. Internet access is a prerequisite to use the system. As an example, the registered customer might be a lawyer representing a client in a civil lawsuit. That lawyer may need to inspect his client's subject computer(s) 8 for documents responsive to a discovery request in the litigation. That lawyer could use the systems to inspect his client's subject computer(s) 8 over the Internet from any examiner computer 6 via the control computer 2. The customer cannot directly connect to the subject computer(s) 8.

Subject computer(s) 8 are selected for inspection, and subject program code is deployed to one or more subject computers 8. When executed, the subject code provides communications via a communication code. The subject computer 8 is then connected to the control computer 2 so that the customer on the examiner computer 6 can access information on the subject computer 8 via the control computer 2. As an example, the custodians (owners/users) of the subject computer(s) 8 to be inspected can be provided a link to an Internet Web site that initiates the customer selected service on their subject computer 8. The custodians might be officers and employees that are parties to a civil lawsuit, and each would receive links to an Internet Web site for downloading subject code to the subject computer 8. For example, the web site can direct the control computer 2 to deliver the subject program code to the subject computer 8. The subject computer 8 is then also connected to a cloud-based data-repository computer 4.

Figure 3:
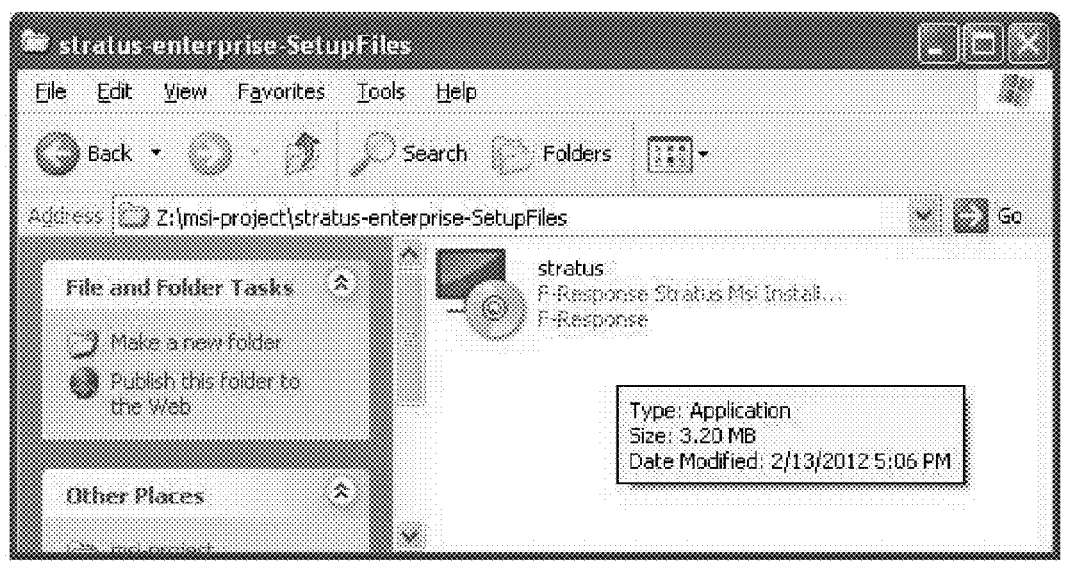
FIG. 3 illustrates a screen capture of the subject program code installation software that is executed on each remote subject computer.

FIG. 3 illustrates a graphical screen capture of the subject program code installation software that is executed on each remote subject computer 8. The subject program code shown is for use with subject computers 8 running Windows-based operating systems.

Figure 4:
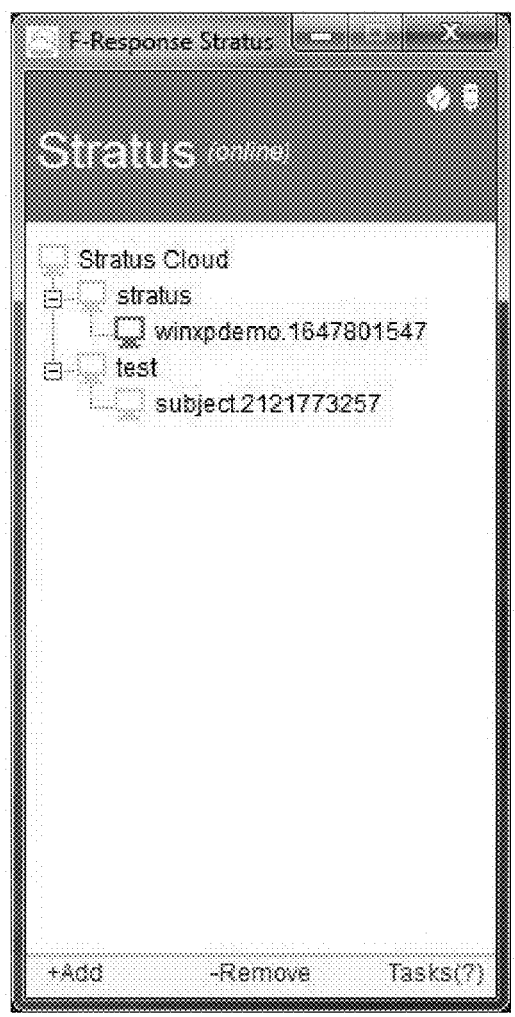
FIG. 4 illustrates a screen capture showing the roster of subject computers, upon which subject program code has been installed for each computer, and which have registered with the command and control computer.

FIG. 4 illustrates a screen capture showing the roster of subject computers 8, upon which subject program code has been installed for each subject computer 8, and which have registered with the command and control computer 2. In this depiction, subject computer 8 "Winxpdemo.1647801547" is online and available for examination, while subject computer 8 "subject.2121773257" is currently offline. When "subject.2121773257" returns online, the icon will change to reflect an online state, and will show that it is available for examination.

Figure 5:
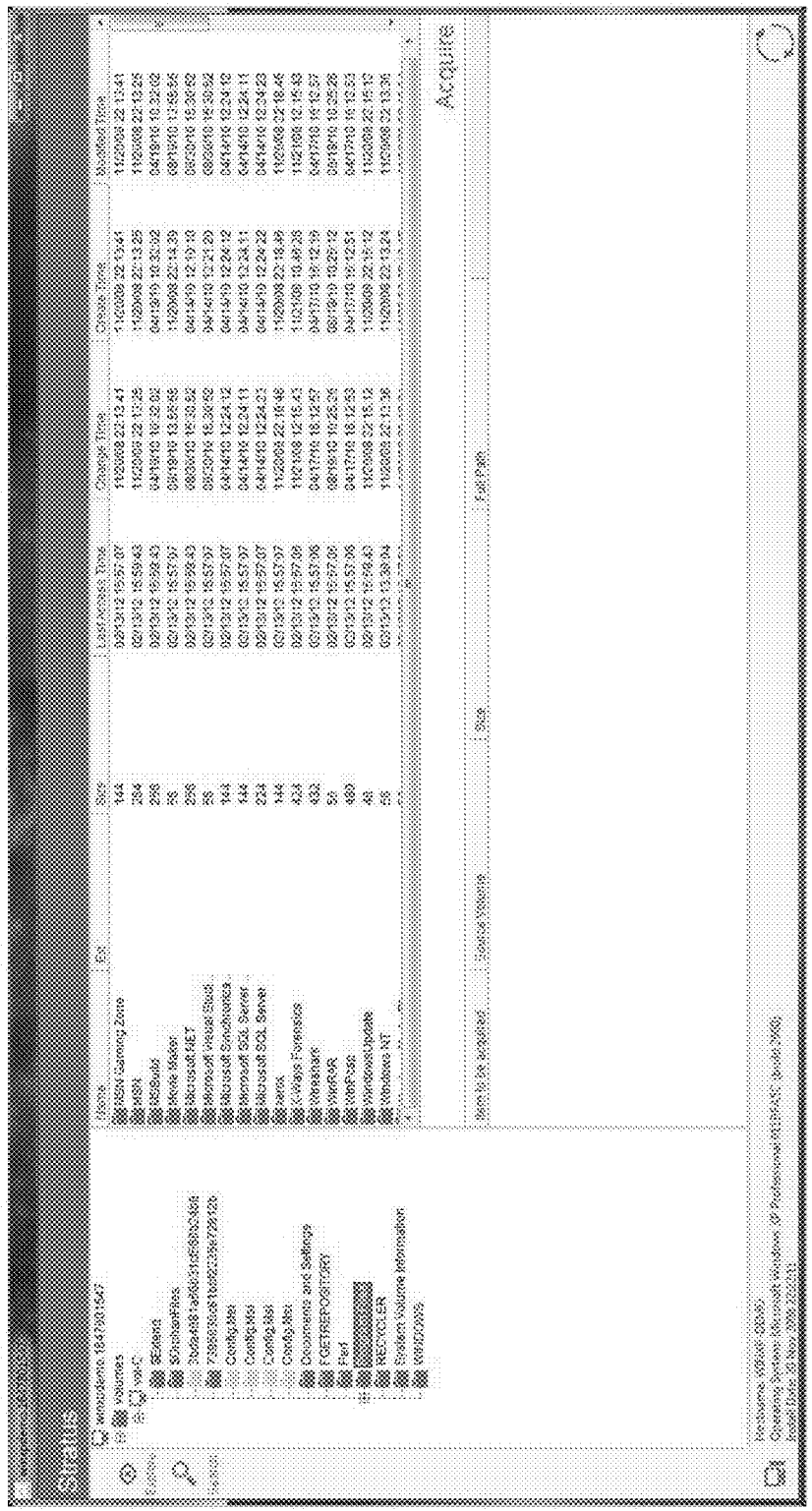
FIG. 5 illustrates a screen capture showing the active examination of subject computer "winxpdemo.1647801547" using the explore capability of the invention.

FIG. 5 illustrates a screen capture showing the active examination of subject computer 8 "winxpdemo.1647801547" using the explore capability of the invention. In this depiction, subject computer 8 "winxpdemo.1647801547" has been selected for examination. This is a screen capture showing the active examination of subject computer 8 "winxpdemo.1647801547" using the invention, which was selected from the subject roster. All of the files and folders, including unallocated space, are available for inspection. The "Explore" tab (depicted) permits exploration of all of the available files and folders, allowing the examiner to select data to be uploaded to the data-repository computer 4. The "Search" tab permits files and folders to be selected for upload to the data-repository computer 4 based upon search criterion, including but not limited to File Metadata date and time information, file name, folder name, file extension, and keyword searching.

Figure 6:
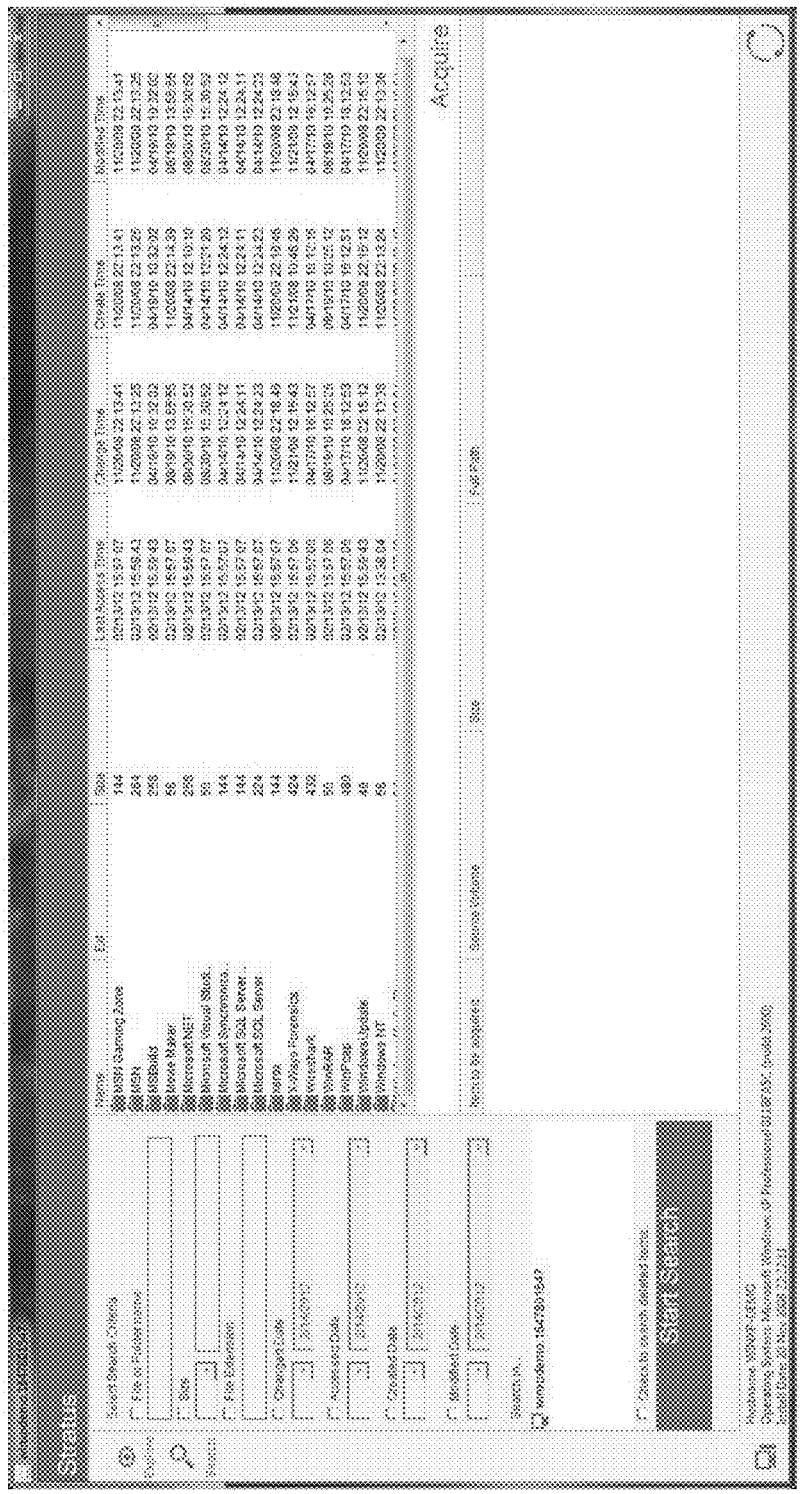
FIG. 6 illustrates a screen capture showing the active examination of subject computer "winxpdemo.1647801547" using the search capability of the invention.

FIG. 6 illustrates a screen capture showing the active examination of subject computer 8 "winxp-demo.1647801547" using the search capability of the invention. In this depiction, subject computer 8 "winxp-demo.1647801547" has been selected for examination. All of the files and folders, including unallocated space, are available for inspection. The "Search" tab (depicted in the figure) permits files and folders to be selected for upload to the data-repository computer 4 based upon search criterion, including but not limited to File Metadata date and time information, file name, folder name, file extension, and keyword searching. The "Explore" tab permits exploration of all of the available files and folders, allowing the examiner to select data to be uploaded to the data-repository computer 4.

Figure 7:
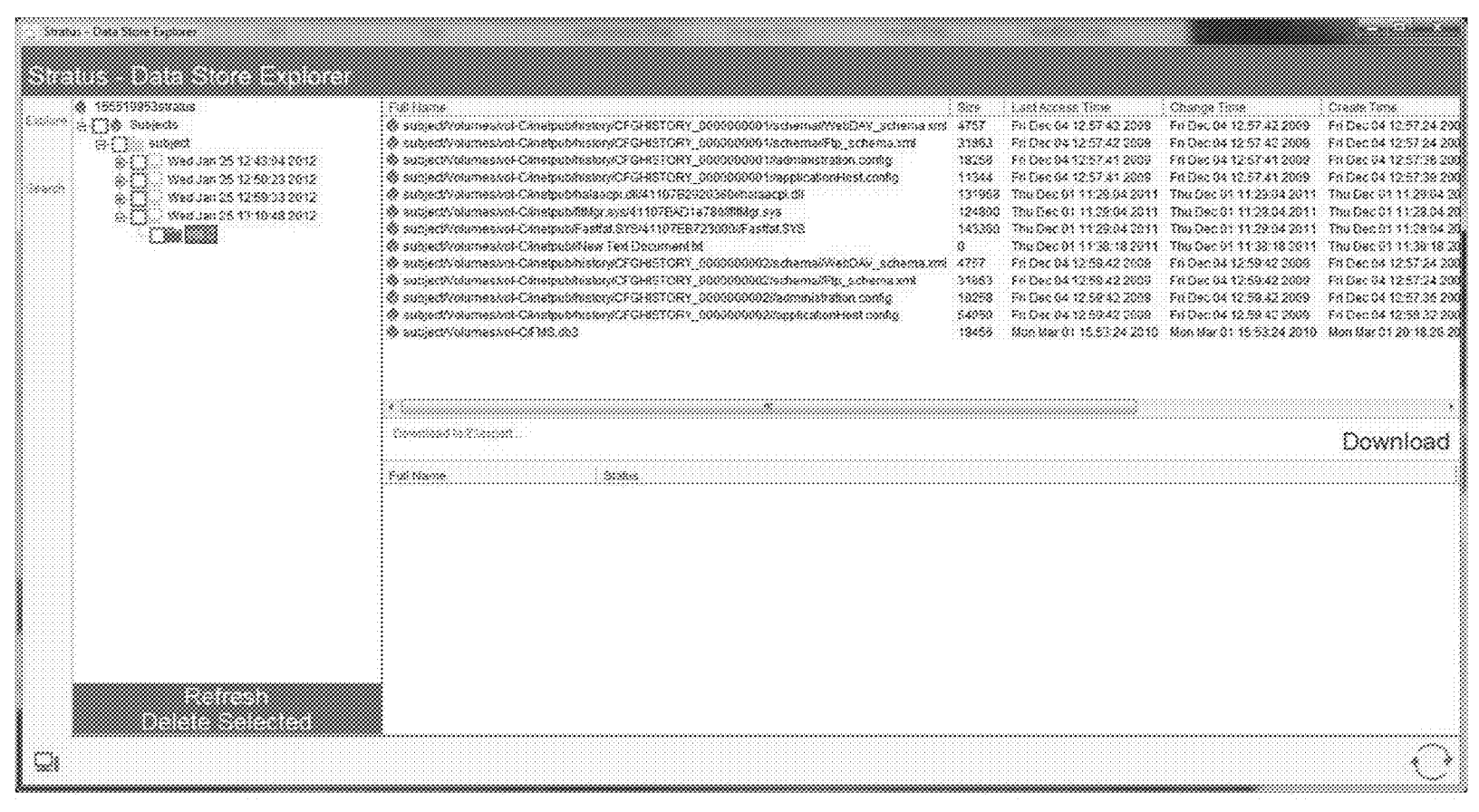

FIG. 7 illustrates a screen capture showing review of the data uploaded to the cloud based computer, such as a data-repository computer 4, using the Data Store Explorer capability of the invention. In this depiction, the data uploaded to the data-repository computer 4 is reviewed by the examiner using the Data Store Explorer capability of the invention. The original File System Metadata, as collected from the subject computer 8, is preserved and stored in the data-repository computer 4.

Figure 8:
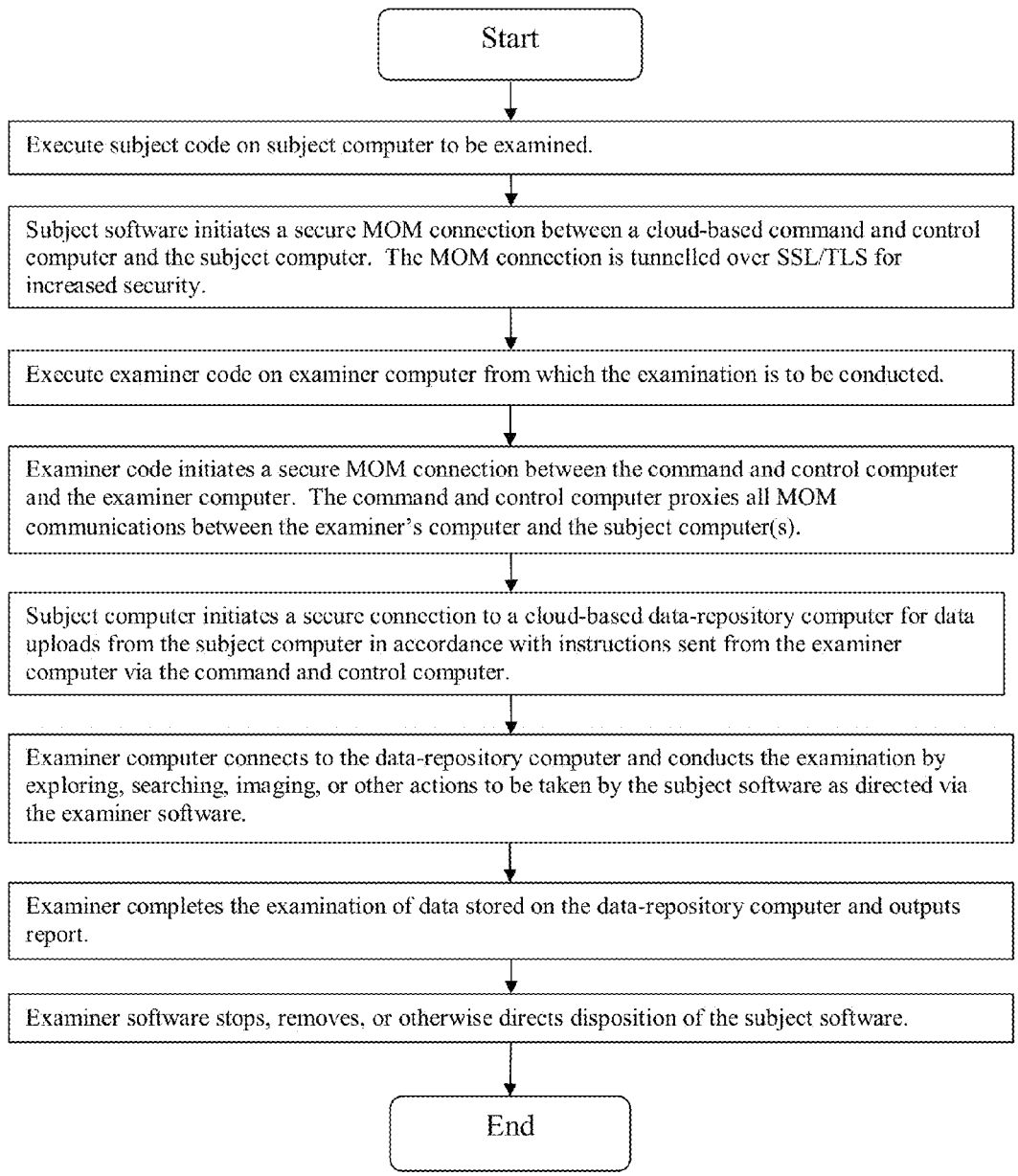
FIG. 8 illustrates a flow chart of an exemplary method according to the present invention rendered via a "cloud computing" model.

FIG. 8 illustrates a flow chart of an exemplary cloud based method according to the present invention.

Figure 9:
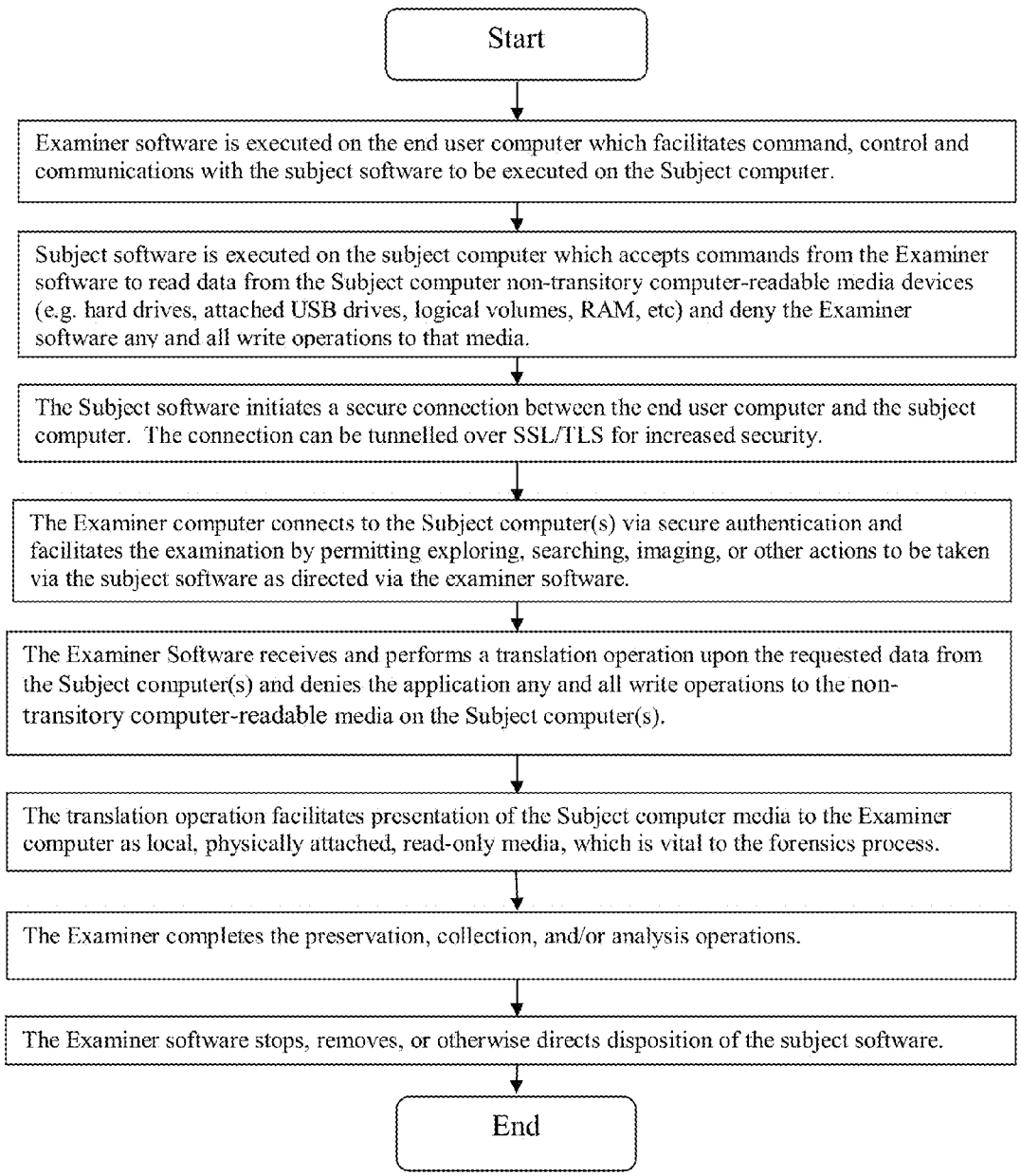
FIG. 9 illustrates a flow chart of an exemplary method according to the present invention rendered via a peer to peer (P2P) model.

FIG. 9 illustrates a flow chart of an exemplary peer to peer network-based method according to the present invention.

Figure 10:
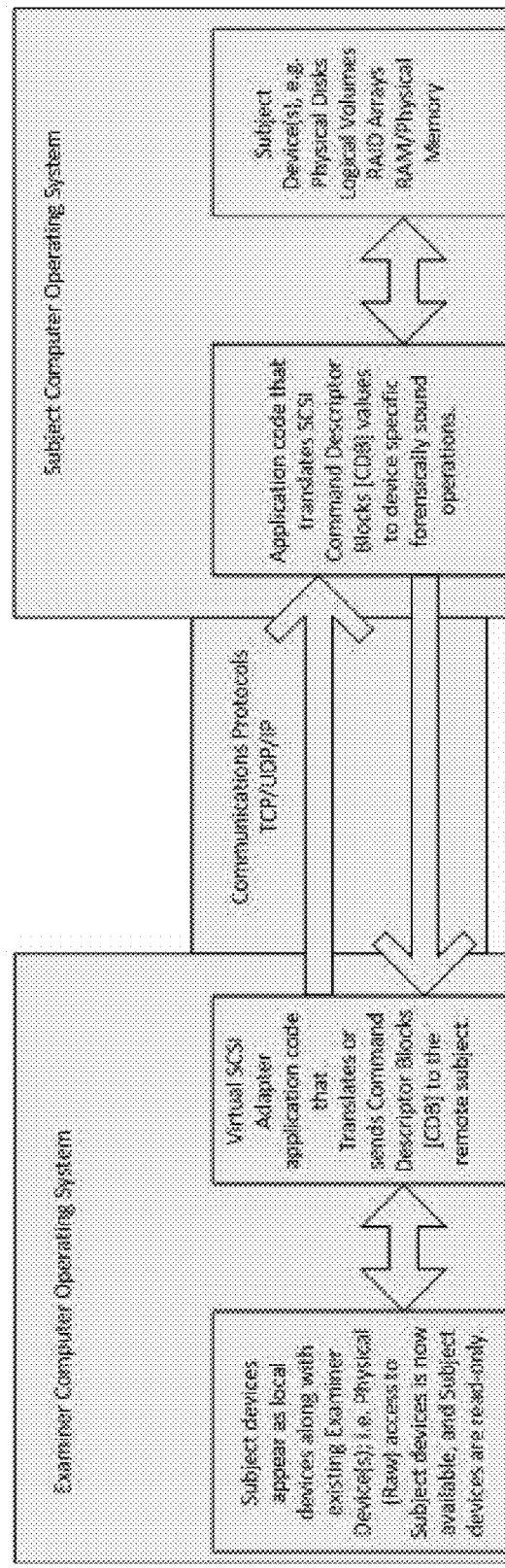
FIG. 10 illustrates a method according to the present invention whereupon every non-transitory computer-readable media device on a subject computer becomes a SCSI disk rendered to the examiner computer as a raw (physical) non-volatile, read-only device.

FIG. 10 illustrates a method according to the present invention whereupon every non-transitory computer-readable media device on a subject computer becomes a SCSI disk rendered on the examiner computer, and that SCSI disk is rendered to the examiner computer as a raw (physical) non-volatile, read-only device. The method translates SCSI and non-SCSI devices such that the SCSI command set is used to establish raw, read-only connectivity to subject computer devices from a second computer, over a network.

The service can comprise any number of explicit actions or instructions, but can be used to collect data from the subject computer(s) 8, and will store the collected data in a forensically sound manner to a storage location in the cloud, such as the data-repository computer 4. As an example, the customer can enter a request into the examiner computer 6 to obtain a listing of all files, including deleted files for which entries remain in the file system tables on the subject computer 8. The control computer 2 will instruct the subject computer 8 to copy the requested data to the data-repository computer 4. The data includes the files along with their original file system Metadata. The communication protocols used prevent the control computer 2 from altering the data on the subject computer(s) 8. Thus, the original file system Metadata will not be altered on the subject computer(s) 8, and will be forensically preserved at the time of collection and stored in the non-volatile memory on the data-repository computer 4.

When the service actions are complete, the customer is notified electronically, and the collected data on the data-repository computer 4 becomes accessible to the customer's examiner computer 6.

Upon review of the stored data, the customer may require additional inspections be performed in order to obtain additional data from one or more subject computer(s) 8. The customer would continue to use the system in the same manner as described above until the inspection effort is completed.

At the completion of the forensic analysis, a report can be outputted.

Definitions for terms used herein are provided below.

Authenticated: Having completed the process of verifying the digital identity of the sender of a communication, such as a request to log in.

Advanced Message Queuing Protocol (AMQP) is a standard Message-Oriented

Middleware (MOM) network protocol that enables conforming client applications to communicate with conforming messaging middleware brokers.

Availability: The degree to which data residing on a computer system is available to the end user who needs it.

Cloud-based command and control computer: A Cloud-based command and control computer is a cloud computing service located on the Internet, or "in the Cloud", that runs command and control software. The command and control software manages connections and communications between the many customers that have examiner and subject computers that may be connected at any time. This service can incorporate a model of networked online computers which may or may not be hosted by third parties.

Cloud-based data-repository computer: A cloud-based data-repository computer is a storage service located on the Internet, or "in the Cloud." This storage service can incorporate a model of networked online storage where data may or may not be hosted by third parties. A commercial example of a preferred data-repository computer is Amazon S3, which is an online storage web service offered by Amazon Web Services.

Cloud Computing: Cloud Computing is Internet-based computing, whereby shared computer resources, software, storage space, and information, are provided to computers and other devices on demand over a suitable communications network.

Communications network: A network of telecommunications links and nodes arranged so that messages may be passed from one part of the network to another over multiple links and through various nodes. Examples include the Internet, local area networks, wide area networks, wireless networks, and the Public Switched Telephone Network.

Confidentiality: Ensuring that information is accessible only to those authorized to have access.

Drive: A device for the mass storage of computer data; e.g. hard drive, thumb drive, flash drive, solid state drive, etc.

eDiscovery (Electronic Discovery): eDiscovery refers to the discovery of electronically stored information (ESI) in the pre-trial phase of a lawsuit. Discovery refers to the means by which each party to a lawsuit can obtain evidence from the opposing party by means of various discovery devices, including, but not limited to, evidence that exists in the form of ESI.

ESI (Electronically Stored Information): Per the Federal Rules of Civil Procedure (FRCP), ESI is understood to be information created, manipulated, communicated, stored, and best utilized in digital form, requiring the use of computer hardware and software.

Forensically Sound: Forensically sound practices are those that do not violate the Federal Rules of Evidence (FRE) such that ESI (Electronically Stored Information) is processed in such a manner that the data can be used as evidence in a court of law. For example, ESI collected for use in a court of law is to be processed in such a manner that the data can be identified and authenticated, as mandated by the FRE. It is worthy of note that the Federal Rules of Evidence (FRE) give forensic practitioners latitude to conduct their work using the principle of reasonableness. For example, a forensic practitioner may elect not to perform an action that could reveal additional responsive data if the cost of that action is deemed to be unreasonably high; however, data not collected in a forensically sound manner may not be deemed reliable for use as evidence in a court of law.

Forensics: A scientific, systematic inspection of a computer system and its contents for evidence or supportive evidence of a crime or other computer use that is being inspected.

HTTPS: Hypertext Transfer Protocol Secure (HTTPS) is the use of Secure Socket Layer (SSL) or Transport Layer Security (TLS) as a sub layer to HTTP application layering. HTTPS is described in RFC 2818. TLS is described in detail in RFC2246. HTTPS encrypts and decrypts user page requests as well as the pages that are returned by a Web server. The use of HTTPS protects against eavesdropping and man-in-the-middle attacks. All references to HTTPS in this document refer to the above definition of HTTPS.

Integrity: Ensuring that information is alterable only by those authorized to do so.

Internet: The worldwide, publicly accessible network of interconnected computer networks that transmit data by packet switching using the standard Internet Protocol (IP).

Message-Oriented Middleware (MOM) refers to network standards and protocols designed to support sending and receiving messages between distributed systems. Several examples include Extensible Messaging and Presence Protocol (XMPP), Advanced Message Queuing Protocol (AMQP), and Streaming Text Oriented Message Protocol (STOMP).

Raw drive access: If raw drive access is provided to computer storage media, then complete access to all information on the subject media is granted.

Read-only: If read-only access is provided to computer storage media, then it is not possible to write to the media given the provided access.

Small Computer System Interface (SCSI): A colloquial term for interface standards developed by T10. Technical Committee T10 is responsible for SCSI Storage Interfaces and SCSI architecture standards (SAM, SAM-2, and SAM-3), which are used by SCSI, SAS, Fibre Channel, SSA, IEEE 1394, USB, and ATAPI. T10 is a Technical Committee of the InterNational Committee on Information Technology Standards (INCITS) [http://www.incits.org]. INCITS is accredited by, and operates under rules that are approved by, the American National Standards Institute (ANSI) [http://www.ansi.org].

Secure: Sound security practices have been applied to reasonably protect the confidentiality, integrity, and availability of a computer resource.

Subject Computer: The computer system upon which forensics analysis is to be conducted is the Subject Computer.

XMPP: XMPP is the Extensible Messaging and Presence Protocol; a set of open technologies for instant messaging, presence, multi-party chat, voice and video calls, collaboration, lightweight middleware, content syndication, and generalized routing of XML data. The Internet Engineering Task Force (IETF) has formalized the core XML streaming protocols as an approved instant messaging and presence technology. The XMPP specifications were published as RFC 3920 and RFC 3921 in 2004. The present invention makes use of this prior art to securely and efficiently transport ESI and system command and control traffic over the Internet.

Cloud Computing is Internet-based computing, whereby shared computer resources, software, storage space, and information, are provided to computers and other devices on demand over a suitable communications network. This invention makes use of existing cloud computing technologies via one or more cloud-based computing servers, and via one or more cloud-based data-repository computers.

The present invention would typically be deployed utilizing a cloud-based computing server to provision services via the Internet, or "in the Cloud", which run the special command and control software that is claimed in the invention. The command and control software manages connections and communications between the many customers that have examiner and subject computers that may be connected at any time. This service incorporates a model of networked online computers where the computer services are generally hosted by third parties.

Some of the most ubiquitous Internet protocols in use today are the Hypertext Transport Protocol (HTTP) and the related HTTPS (HTTP over SSL, or HTTP Secure). HTTP is the foundation of data communication for the World Wide Web. HTTPS is the use of Secure Socket Layer (SSL) or Transport Layer Security (TLS) as a sub layer to HTTP application layering. HTTPS encrypts and decrypts user page requests as well as the pages that are returned by a Web server. The use of HTTPS protects against eavesdropping and man-in-the-middle attacks. All references to HTTPS in this document refer to the above definition of HTTPS. The present invention makes use of this prior art to securely and efficiently transport ESI and system command and control traffic over the Internet. Preferably, the communications protocol used is non-proprietary.

It is to be understood that the foregoing illustrative embodiments have been provided merely for the purpose of explanation and are in no way to be construed as limiting of the invention. Words used herein are words of description and illustration, rather than words of limitation. In addition, the advantages and objectives described herein may not be realized by each and every embodiment practicing the present invention. Further, although the invention has been described herein with reference to particular structure, steps and/or embodiments, the invention is not intended to be limited to the particulars disclosed herein. Rather, the invention extends to all functionally equivalent structures, methods and uses, such as are within the scope of the appended claims. Those skilled in the art, having the benefit of the teachings of this specification, may affect numerous modifications thereto and changes may be made without departing from the scope and spirit of the invention.

We claim:

1. A method of performing an Internet based forensic analysis or eDiscovery of a subject computer having a non-transitory computer-readable media comprising:

executing on a cloud-based control computer a control program code configured to provide communications via a communication protocol;

executing on the subject computer a subject program code configured to provide communications via a communication protocol;

establishing a connection over the Internet between the cloud-based control computer and the subject computer via the communication protocol;

executing an examiner program code on an examiner computer configured to provide communications via a communication protocol;

establishing a connection over the Internet between the cloud-based control computer and the examiner computer via the communication protocol;

establishing a connection over the Internet between the subject computer and a cloud-based data-repository computer, wherein no direct connection between the control computer and the data-repository computer is established and no direct connection between the examiner computer and the subject computer is established;

executing commands on the examiner computer which directs the control computer to direct the subject computer to copy selected data stored in a non-transitory computer-readable media memory of the subject computer to a non-volatile memory on the data-repository computer in a manner that catalogues and preserves the integrity of the data, wherein the communication protocol operates in accordance with a communication protocol standard that includes one or more write commands for writing data to a non-volatile memory, wherein the subject program code is configured to respond to at least one protocol command in accordance with the communication protocol standard, wherein the subject program code is configured to not write data to the non-transitory computer-readable media of the subject computer in response to receiving the one or more write commands of the communication protocol standard from the control computer;

establishing a connection over the Internet between the data-repository computer and the examiner computer;

performing a forensic analysis or eDiscovery process of the data stored on the data-repository computer via the Internet connection to the examiner computer; and outputting a report based on the forensic analysis or eDiscovery process.

2. The method according to claim 1, further comprising logging onto a website using the examiner computer, registering information on the website, and downloading the examiner program code from the website.

3. The method according to claim 1, further comprising downloading the subject program code from the cloud-based computer to the subject computer over the Internet.

4. The method according to claim 1, wherein the only connection between the examiner computer and the subject computer is via the control computer.

5. The method according to claim 1, wherein communication protocol is a non-proprietary communication protocol and the communication protocol standard is a non-proprietary communication protocol standard.

6. The method according to claim 1, wherein the step of executing on the subject computer the subject program code further comprises connecting the subject computer to the Internet, logging onto a website and downloading the subject program code from the website over the Internet.

7. The method according to claim 1, wherein the computer protocol comprises Message-Oriented Middleware (MOM), such as Extensible Messaging and Presence Protocol (XMPP) or Advanced Message Queuing Protocol (AMQP), and the method further comprises exchanging communications over the Internet via SSL/TLS.

8. The method of claim 1, wherein the forensic analysis is conducted in a manner that is suitable for use in a court of law.

9. The method of claim 1, wherein the forensic analysis is conducted such that the existing files or file system Metadata on the subject computer is not altered.

10. The method of claim 1, further comprising copying file system Metadata from the subject computer and maintaining the file system Metadata in the data-repository computer.

11. The method of claim 1, further comprising providing a computer file listing of all computer files, including deleted files for which entries remain in the file system tables of the subject computer, in the report.

12. The method of claim 1, further comprising conducting the forensic analysis such that the original ESI file system Metadata is not be altered on the subject computer and is forensically preserved at the time of collection on the data-repository computer.

13. The method of claim 1, further comprising outputting a forensic image of the subject computer in the report.

14. The method according to claim 1, further comprising storing a forensic image of the subject computer on the data-repository computer.

15. The method of claim 1, further comprising selecting and uploading data comprising at least one of file system Metadata date and time information, file name, folder name, file extension, and keyword searching from the subject computer to the data-repository computer.

16. The method of claim 1, further comprising conducting the forensic analysis without direct assistance from an expert forensics practitioner.

17. A method of performing a forensic analysis or eDiscovery of a subject computer having non-transitory computer-readable media comprising:

executing on the subject computer a subject program code configured to provide communications via a communication protocol;

executing on a cloud-based computer a control program code configured to provide communications via the communication protocol;

establishing a connection between the cloud-based computer and the subject computer via the communication protocol;

executing an examiner program code on an examiner computer configured to provide communications via the communication protocol;

establishing a connection between the examiner computer and the cloud-based computer;

executing commands on the examiner computer that directs the cloud-based computer to direct the subject computer to copy selected data from a non-transitory computer-readable media of the subject computer to a non-volatile memory on the cloud-based computer in a manner that catalogues and preserves the integrity of the data, wherein the communication protocol operates in accordance with a communication protocol standard that includes one or more write commands for writing data to a non-volatile memory, wherein the subject program code is configured to respond to at least one protocol command in accordance with the communication protocol standard, wherein the subject program code is configured to not write data to the non-transitory computer-readable media of the subject computer in response to receiving the one or more write commands of the communication protocol standard;

performing a forensic analysis or eDiscovery process of the data stored on the cloud-based computer via the connection to the examiner computer; and outputting a report based on the forensic analysis or eDiscovery process.

18. The method of claim 17, wherein the cloud-based computer comprises a command and control computer and a data-repository computer, the method further comprising executing the control program code on the command and control computer and storing the data from the subject computer on the data-repository computer.

19. The method of claim 18, wherein the cloud-based computer comprises a private network-based command and control computer and a private network-based data-repository computer, the method further comprising executing the control program code on the command and control server and storing the data from the subject computer on the data-repository computer.

20. The method of claim 1, further comprising selecting and uploading data comprising at least one of file system Metadata date and time information, file name, folder name, file extension, and keyword searching from the subject computer to the cloud-based computer.

21. A computer program product, comprising one or more non-transitory computer usable media having a computer readable program code embodied therein, the computer readable program code adapted to be executed by a subject computer, a cloud-based computer, and an examiner computer to implement a method of performing a forensic investigation or eDiscovery process of the subject computer having a non-transitory computer-readable media, the computer program product comprising:
   a subject program code for execution by the subject computer;
   a control program code for execution by the cloud-based computer; and
   an examiner program code segment for execution by the examiner computer, wherein the subject program code and the control program code are executable to establish a connection between the subject computer and the cloud-based computer via a communication protocol, wherein the control program code and the examiner program code are executable to establish a connection between the examiner computer and the cloud-based computer via a communication protocol, wherein the communication protocol operates in accordance with a communication protocol standard that includes one or more write commands for writing data to a non-volatile, non-transitory, memory, wherein the subject program code is executable to respond to commands in accordance with the communication protocol standard; wherein the subject program code is executable to not write data to the non-transitory computer-readable media in response to receiving the one or more write commands of the communication protocol standard, wherein the subject program code is executable to copy selected data from the non-transitory computer-readable media of the subject computer to the non-volatile memory of the cloud-based computer in a manner that catalogues and preserves the integrity of the data, and wherein the examiner program code is executable to perform a forensic analysis or eDiscovery process of the data stored on the cloud-based computer via the connection from the examiner computer to the cloud-based computer.

22. The product according to claim 21, wherein the program code is executable to not provide a direct connection between the examiner computer and the subject computer.

23. The product according to claim 21, wherein the cloud-based computer comprises a control computer and data-repository computer, the control program code being executable on the control computer, and the subject program code is executable to provide a connection between a cloud-based data-repository computer and the subject computer so that the data copied from the subject computer is stored on the data-repository computer.

24. The product according to claim 23, wherein the program code is executable to not provide a direct connection between the control computer and the data-repository computer.

25. The product according to claim 23, wherein the examiner program code is executable to provide a connection between the examiner computer and the data-repository computer.

26. A computer system constructed to perform an Internet based forensic analysis or eDiscovery of a subject computer having a non-transitory computer-readable media comprising:
   a cloud-based control computer constructed to provide communications via a communication protocol over the Internet with the subject computer and an examiner computer; and
   a cloud-based data-repository computer constructed to provide communications via a communication protocol over the Internet with the subject computer and the examiner computer, the data-repository computer comprising a non-volatile memory constructed to catalogue and preserve the integrity of data stored thereon, the control computer and data-repository computer being constructed so that when commands on the examiner computer are executed the control computer will direct the subject computer to copy selected data stored in a non-transitory computer-readable media of the subject computer to the non-volatile memory on the data-repository computer in a manner that catalogues and preserves the integrity of the data, wherein the communication protocol operates in accordance with a communication protocol standard that includes one or more write commands for writing data to a non-transitory computer-readable media, and the control computer is configured to not write data to the non-transitory computer-readable media of the subject computer.

27. The computer system according to claim 26, wherein the control computer and data-repository computers are constructed so that they can only be connected to one another through an examiner computer or a subject computer.

28. The computer system according to claim 26, wherein the control computer is constructed to provide a website so that when a customer logs onto the website using the examiner computer, the customer can register information and download the examiner program code from the website to the examiner computer.

29. The computer system according to claim 26, wherein the subject program code is constructed to translate commands from the non-transitory computer-readable media to a SCSI non-transitory computer-readable media device to be read only and cannot write to non-transitory computer-readable media in response to receiving any command including a write command.

30. A method of performing a forensic investigation of a subject computer having a non-transitory computer-readable media with a control computer, comprising:
   executing subject program code on the subject computer, wherein the subject program code is constructed to translate commands from the non-transitory computer-readable media to a SCSI non-transitory computer-readable media device to be read only and cannot write to non-transitory computer-readable media in response to receiving any command including a write command;
   executing control program code on the control computer; and
   establishing a secure authenticated connection between the subject computer and the control computer, wherein execution of the control program code provides physical access to the subject computer memory from the control computer.

31. The method according to claim 30, further comprising translating commands to or from the subject computer virtual, logical, or physical non-transitory computer-readable media device to a SCSI non-transitory computer-readable media device and rendering the device as a read-only non-transitory computer-readable media device on the control computer.

32. The method according to claim 30, further comprising translating commands to or from the subject computer virtual, logical, or physical non-transitory computer-readable media device to a SCSI non-transitory computer-readable media device and rendering the device as a physical non-transitory computer-readable media device on the control computer.

33. The method according to claim 30, wherein execution of the subject program code provides read-only access to the subject non-transitory computer-readable media from the control computer.

34. The method according to claim 30, wherein execution of the subject program code provides raw (physical) access to the subject non-transitory computer-readable media from the control computer.

35. The method according to claim 30, wherein execution of the subject program code translates communications to or from a standard non-transitory computer-readable media device to a SCSI device to a SCSI device and renders the subject computer device as a read-only non-volatile memory device to the control computer.

36. The method according to claim 30, wherein execution of the subject program code translates communications to or from a standard non-transitory computer-readable media device to a SCSI device to a SCSI device and renders the subject computer device as a physical non-volatile memory device to the control computer.

37. The method according to claim 30, wherein execution of the subject program code translates communications to or from a virtual non-transitory computer-readable media device to a SCSI device and renders the subject computer device as a read-only non-volatile memory device to the control computer.

38. The method according to claim 30, wherein execution of the subject program code translates communications to or from a virtual non-transitory computer-readable media device to a SCSI device and renders the subject computer device as a physical non-volatile memory device to the control computer.

39. A computer program product, comprising one or more non-transitory computer usable media having a computer readable program code embodied therein, the computer readable program code adapted to be executed by a first computer and a control computer to implement a method of performing a forensic investigation of the first computer having a non-transitory computer-readable media with the control computer, the computer program product comprising: a subject code segment for execution by the first computer; a control code segment for execution by the control computer; wherein the subject code segment and the control code segment are executable to establish a connection between the first computer and the control computer via a communication protocol; wherein the communication protocol includes one or more write commands for writing data to a non-volatile, non-transitory, memory, wherein the subject code segment is executable to respond to a plurality of commands in accordance with the communication protocol; wherein the subject program code is constructed to translate commands from a non-transitory computer-readable media device to a SCSI non-transitory computer-readable media device to be read only and cannot write to non-transitory computer-readable media in response to receiving any command including a write command; and wherein the control code segment is executable to perform a forensic analysis of the subject computer via the connection.

\* \* \* \* \*